United States Patent [19]

Willenz et al.

[11] Patent Number: 5,586,303
[45] Date of Patent: Dec. 17, 1996

[54] STRUCTURE AND METHOD FOR PROVIDING A CACHE MEMORY OF SELECTABLE SIZES

[75] Inventors: Avigdor Willenz, Saratoga; Steven M. Eliscu, Santa Clara; Martin E. Mueller, Fremont, all of Calif.

[73] Assignee: Integrated Device Technology, Inc., Santa Clara, Calif.

[21] Appl. No.: 415,786

[22] Filed: Apr. 3, 1995

Related U.S. Application Data

[63] Continuation of Ser. No. 835,165, Feb. 12, 1992, abandoned.

[51] Int. Cl.⁶ ........................................ G06F 12/04
[52] U.S. Cl. .................. 395/497.03; 395/445; 395/450; 364/DIG. 1; 364/243.41; 364/245.1
[58] Field of Search .................... 395/445, 450, 395/497.01, 497.02, 497.03, 497.04, 402, 403, 421.02

[56] References Cited

U.S. PATENT DOCUMENTS

| | | | |
|---|---|---|---|
| 4,315,312 | 2/1982 | Schmidt | 395/497.03 |
| 4,571,676 | 2/1986 | Mantellina et al. | 395/497.03 |
| 4,809,234 | 2/1989 | Kuwashiro | 395/497.02 |
| 4,908,789 | 3/1990 | Blokkum et al. | 395/497.03 |
| 4,992,977 | 2/1991 | Matoba et al. | 395/425 |
| 5,014,195 | 5/1991 | Farrell et al. | 395/425 |
| 5,226,141 | 7/1993 | Esbensen | 395/497.02 |
| 5,276,832 | 1/1994 | Holman, Jr. | 395/497.03 |

*Primary Examiner*—Eddie P. Chan
*Assistant Examiner*—Hiep T. Nguyen
*Attorney, Agent, or Firm*—Skjerven, Morrill, MacPherson, Franklin and Friel

[57] ABSTRACT

A method and a structure provide a flexible cache module for use in cache memory performance modelling. The flexible cache module can be configured by jumper connections or switches into a cache memory having a line size and a cache size selectable from a number of combinations of line size and cache size. In addition, the flexible cache module can also be configured as either a split cache memory, for implementing separate data and instruction caches, or a unified cache memory.

2 Claims, 6 Drawing Sheets

4 MEG SPLIT OR UNIFIED

2 MEG UNIFIED

2 MEG SPLIT

1 MEG UNIFIED

1 MEG SPLIT

512K UNIFIED    512K SPLIT

256K UNIFIED

256K SPLIT

128K UNIFIED    128K SPLIT NOT SUPPORTED BY R4000

4 WORDS/LINE

8 WORDS/LINE

16 WORDS/LINE

32 WORDS/LINE

STRUCTURE AND METHOD FOR PROVIDING A CACHE MEMORY OF SELECTABLE SIZES

This application is a continuation of application Ser. No. 07/835,165, filed Feb. 12, 1992, now abandoned.

FIELD OF THE INVENTION

This invention relates to computer systems, and in particular relates to computer systems with cache memories.

BACKGROUND OF THE INVENTION

The effectiveness of a cache memory system is related to the organization of the cache memory. Three of the variables involved in a cache memory design are the cache size, the line size and whether the cache is a split or a unified cache. The cache size refers to the total amount of storage available. The line size refers to the number of words sharing a tag in the cache. All words within a line are moved into and out of the cache together. In a split cache, instructions and data are cached separately. By contrast, in a unified cache, no distinction is made between instructions and data.

These variables affect cache performance in manners which are not always straightforward. For example, as the cache size increases, cache performance also increases. However, the relationship between cache performance and cache size depends also upon many other factors, such as the software environment, including system software, code size, main memory architecture and latency.

Generally, a larger line size improves cache performance because, due to locality of reference, the larger number of words prefetched may reduce future memory accesses. However, for a given cache size, a larger line size decreases the number of lines which can be resident in the cache, thereby increases the possibility of thrashing.

Finally, since instructions and data exhibit different patterns of locality of reference, cache performance is affected by whether the cache memory system is organized as a split cache or a unified cache. In some applications, e.g. where a relative small block of instructions operates on a large randomized data space, a split cache has a performance advantage due to the higher instruction hit rates; in other applications, a unified cache has a performance advantage.

Thus, for a given application, an optimal cache configuration can be derived only after extensive evaluations. Such evaluations are necessary to assist the computer system designer to determine which cache configuration best meets his or her design objectives. Traditionally, evaluations are performed using simulations in software. However, such simulations are often limited in accuracy, flexibility and speed. Because of a computer system's inherent complexity, accurately modelling the operation of a cache memory in software is difficult. In particular, many asynchronous events of a real computer system, such as direct memory access (DMA) and exception conditions, are difficult to model in software.

SUMMARY OF THE INVENTION

In accordance with the present invention, a structure and a method provide a flexible cache module which can be configured by jumper connections or switches into a cache memory of a selectable cache size. The line size of the flexible cache module of the present invention is also selectable by jumper connections or switches. In addition, the flexible cache memory can be used to implement either a split or a unified cache.

In one embodiment, jumper connections ground one or more selected address bits of the input memory address signals received at the tag and data portions of the cache memory, so as to limit the number of memory locations in the tag and data portions of the cache memory addressable the input memory address signals, and thereby reduces the effective size of cache memory.

In that embodiment also, jumper connections ground one or more selected bits of the input memory address signals received at the tag portion of the cache memory, so as to limit the number of tags addressable by the memory address signals received, and thereby increases the line size of the cache memory.

Further, in that embodiment, a designated bit of the memory address substitutes one of the memory address signals received by the data portion of the cache memory. The designated bit of the memory address indicates whether a data or an instruction is accessed in the flexible cache module.

The present invention allows real-time evaluations of cache performance to be carried out under various configurations of the cache memory. The cache memory can be reconfigured by simply setting a small number of switches or jumper connections. Thus, an optimal configuration for a cache memory in a given application can be obtained in accordance with such evaluations.

The present invention is better understood upon consideration of the detailed description provided below and the accompanying drawings.

DETAILED DESCRIPTION OF THE PREFERRED EMBODIMENTS

The present invention provides a structure and a method for implementing one of various configurations of a cache memory. According to the present invention, using on-off switches or jumpers, the user can reconfigure the cache memory between these configurations by selectively connecting a small number of terminals. The structure in accordance with the present invention can be used in a development system to allow performance evaluation of the various cache configurations. Since the user can easily switch between the various configurations by making jumper connections at a few terminals, the user can determine the optimal size of a cache for a given application in accordance with the evaluations of the computer system's performance under various configurations.

Although the present invention is described herein using as an example a flexible cache module for implementing a secondary cache in a R4000[1] microprocessor system, the present invention is applicable in general to any cache memory system.

[1] The R4000 is a microprocessor produced by the Assignee under license from MIPS Computer Systems, Inc., Sunnyvale Calif.

Figure 1:
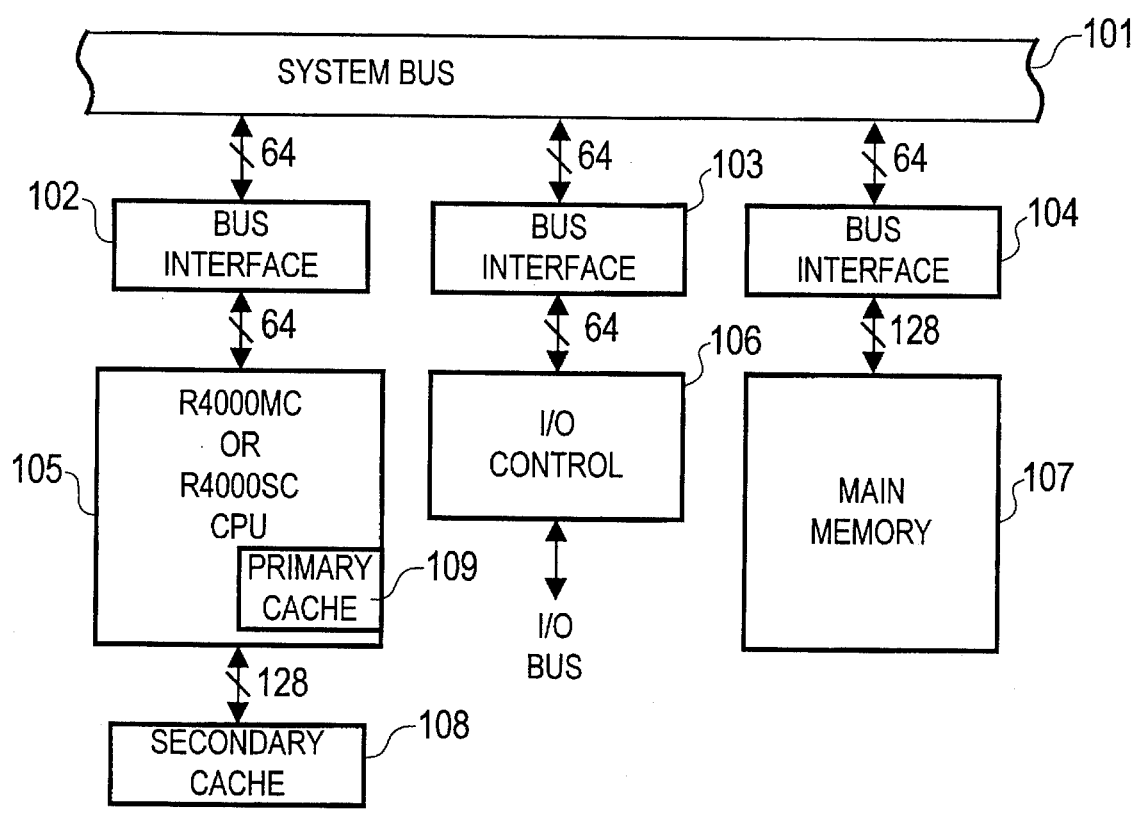
FIG. 1 shows microprocessor system 100 in which the flexible cache module of the present invention can be deployed.

FIG. 1 shows a microprocessor system 100 in which the flexible cache module of the present invention can be deployed. As shown in FIG. 1, a system bus 101 is connected over bus interfaces 102–104 to a microprocessor 105, an I/O controller 106, and main memory system 107. Microprocessor 105 has a two-level cache memory architecture, in which an on-chip primary cache 109 and an off-chip secondary cache 108 are provided. The present invention provides a flexible cache module which can be used to implement secondary cache 108.

Figure 2:
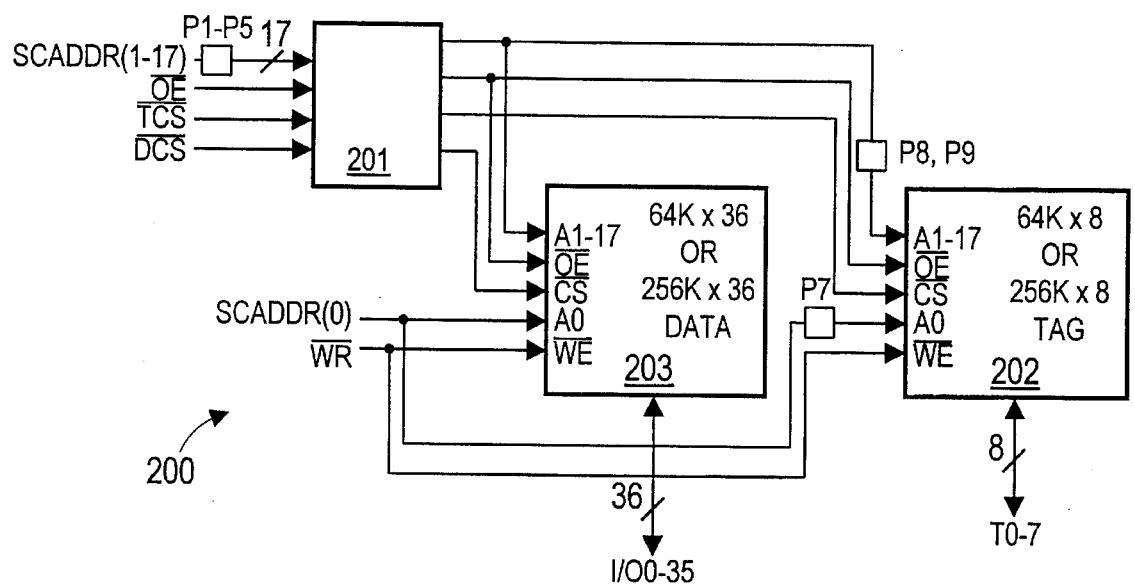
FIG. 2 is a block diagram of flexible cache module 200 of the present invention.

A first embodiment of the present invention, shown in FIG. 2, allows the user to configure flexible cache module 200 as a 128K-byte, 256K-byte, 512K-byte, 1 Megabyte, or 4 Megabyte cache memory system. In addition, the user can configure the flexible cache module 200 either as a split cache or a unified cache, and select a 4-word, 8-word, 16-word or 32-word line size. As shown in FIG. 2, the flexible cache module 200 comprises address buffers 201, tag portion 202, data portion 203, and configurable jumpers P1-P9. In this embodiment, tag portions 202 and data portion 203 are implemented by industry standard 256K×4 static random access memory (SRAM) chips. However, Address buffers 201 receives 17 bits (SCAddr[1:17]) of an 18-bit address (SCAddr[0:17]), an output enable signal ($\overline{OE}$), a tag chip-select signal ($\overline{TCS}$), and a data chip-select signal ($\overline{DCS}$). These signals are buffered by address buffers 200 and distributed to tag portion 202 and data portion 203. In addition, the flexible cache module 200 also receives the remaining address bit SCAddr[0] of 18-bit address SCAddr [0:17]. Address bit SCAddr[0] is provided directly to data portion 203 and, through jumpers P7, to tag portion 202. A write enable signal ($\overline{WE}$) is also provided unbuffered to both tag portion 202 and data portion 203. In the present embodiment, SCAddr[0] and WE signals are provided unbuffered to meet timing constraints of the R4000 microprocessor. Such timing constraints are described in Chapter 11 of the R4000 User's Manual available from Integrated Device Technology, Santa Clara, Calif. The R4000 User's manual is hereby incorporated by reference in its entirety to provide background technical information of an R4000 microprocessor system.

Figure 3:
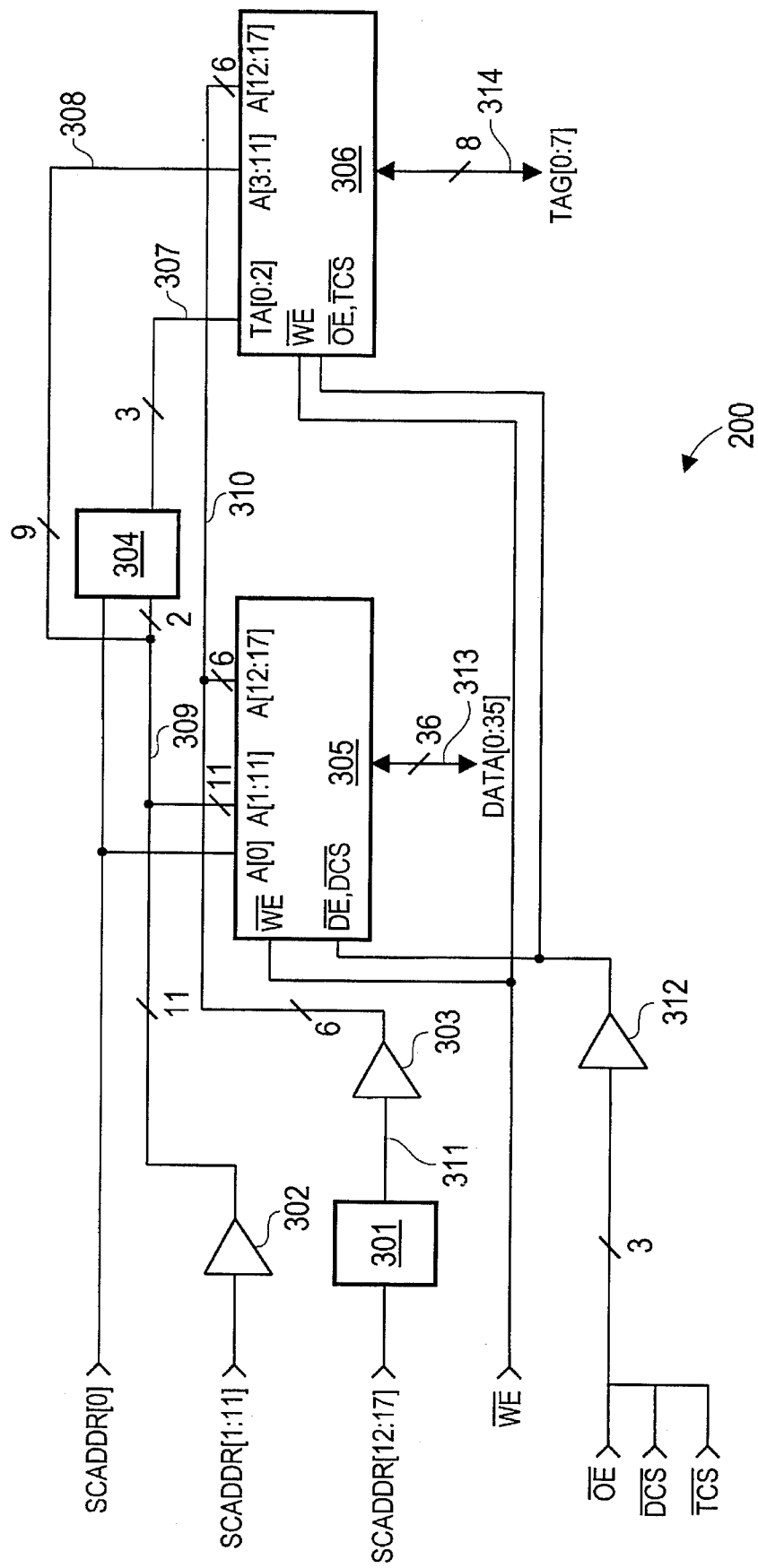
FIG. 3 is a schematic circuit of flexible cache module 200 of FIG. 2.

FIG. 3 is a schematic circuit of FIG. 2's flexible cache module 200. In FIG. 3, memory portions 305 and 306 implement using SRAMs data portion 203 and tag portion 202 respectively. Address bit SCAddr[0] is provided unbuffered to the SRAMs of memory portion 305 as an address signal. Address bit SCAddr[0] is also provided to jumpers 304. Address bits SCAddr[1:11] are buffered by buffers 302 and provided on bus 309 to memory portion 305 as 11 address bits. The two address bits corresponding to buffered address bits SCAddr[1:2] on bus 309 are provided to jumpers 304. The 3-bit output bus of jumpers 304 is provided as three address bits of memory portion 306. The remaining bits, i.e. buffered address bits SCAddr[3:11] of bus 309 are provided as 9 address bits to memory portion 306. Address bits SCAddr[12:17] are provided to jumpers 301. Jumpers 301 has six output signals which are provided on output bus 310 after being buffered by buffers 303. Bus 310 provides 6 address bits to each of memory portions 305 and 306. Control signals $\overline{OE}$ and $\overline{DCS}$, buffered by buffers 312, are provided to memory portion 305. Control signals $\overline{OE}$ and $\overline{TCS}$, also buffered by buffers 312, are provided to memory portion 306. Control signal $\overline{WE}$ is provided unbuffered to both memory portions 305 and 306. Memory portion 305 has a bidirectional 36-bit data I/O bus 313 and memory portion 306 has an 8-bit bidirectional data I/O bus 314.

Figure 4:
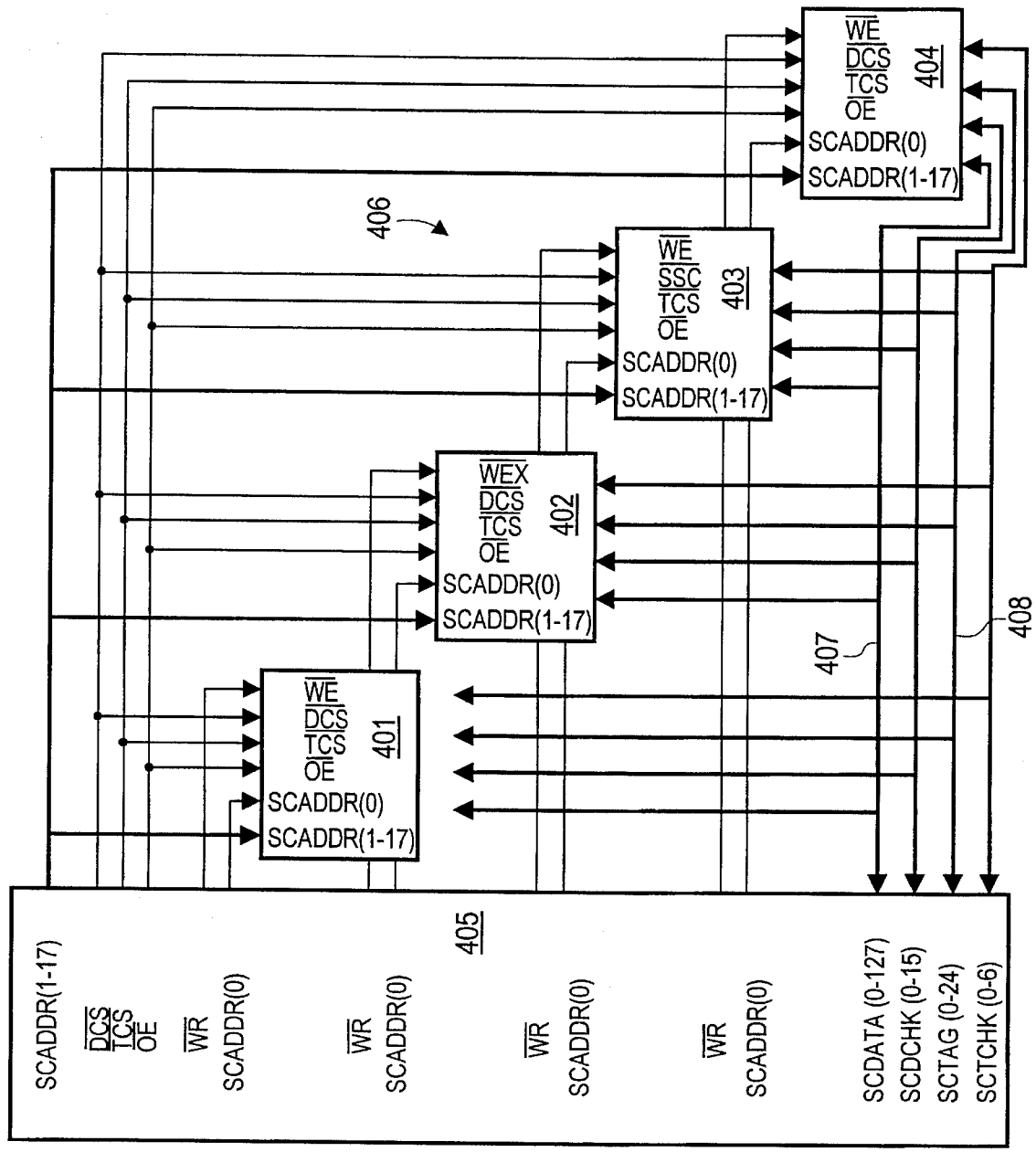
FIG. 4 shows using four flexible cache modules 401–404 forming a secondary cache 406 of a microprocessor 405.

In flexible cache module 200 of FIG. 2, the data portion 203 has 36 I/O pins for data storage, and 8 I/O pins for tag storage. Four flexible cache modules are used to form secondary cache 108 of FIG. 1's microprocessor system 100. FIG. 4 shows four flexible cache modules 401–404 forming a secondary cache 406 of microprocessor 405. In FIG. 4, the data portions of flexible cache modules 401–404 provides a 128-bit data bus 407 and a 16-bit wide error checking and correction (ECC) field to ensure data integrity in data bus 407. The tag portions of flexible cache modules 401–404 form a 25-bit tag bus 408 with a 7-bit wide ECC for data integrity in tag bus 408. The SCAddr[0] and $\overline{WE}$ signals, which are provided unbuffered to the SRAMs of flexible cache modules 401–404, are each duplicated four times by microprocessor 405 so as to be able to directly drive the 44 SRAMs in the flexible cache modules 401–404.

Figures 5A, 5B:
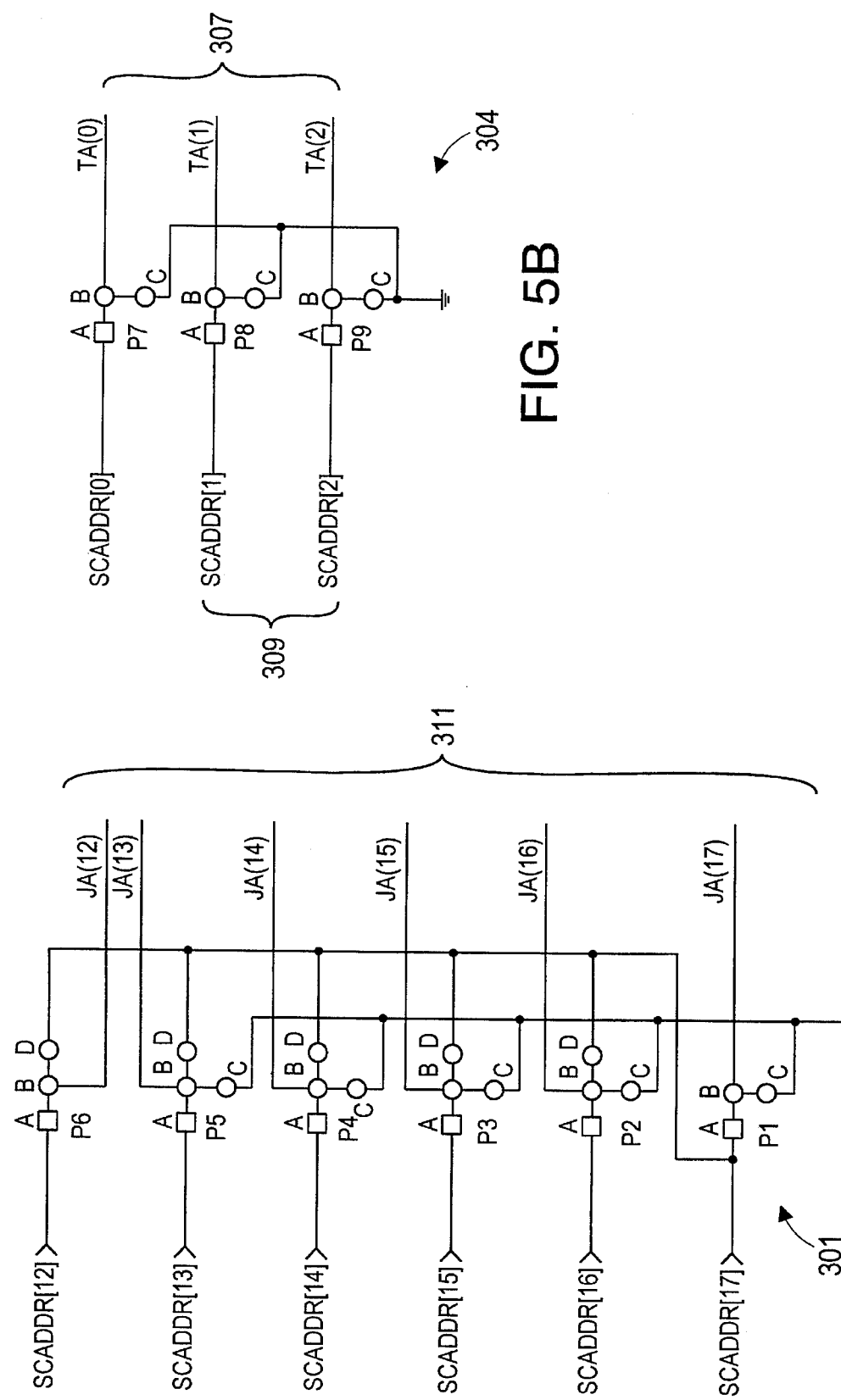
FIG. 5a shows the structure corresponding to jumpers 301 of FIG. 3.
FIG. 5b shows the structure corresponding to jumpers 304 of FIG. 3.
Figure 6:
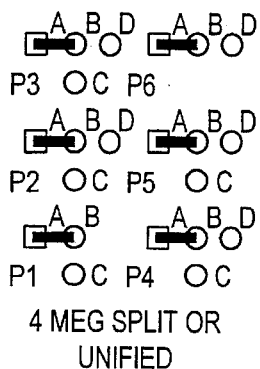
FIG. 6 shows the configurations of jumpers 301 and jumpers 304 used to effectuate various configuration of flexible cache module 200.
Figure 6:
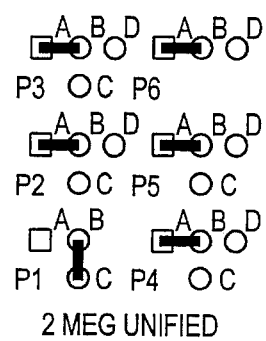
Figure 6:
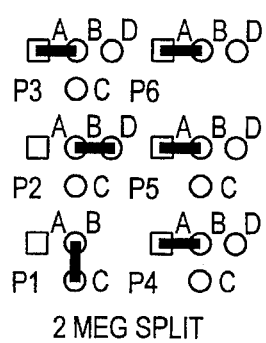
Figure 6:
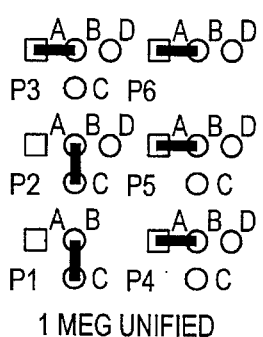
Figure 6:
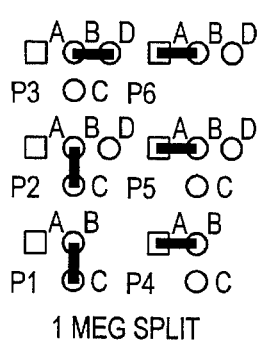
Figure 6:
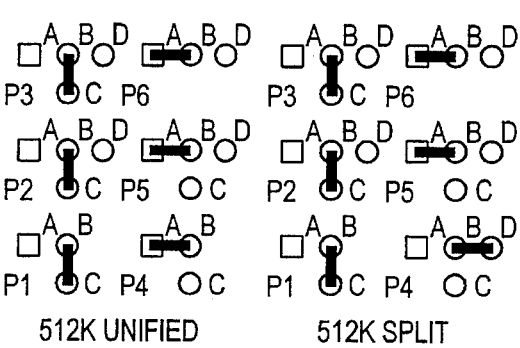
Figure 6:
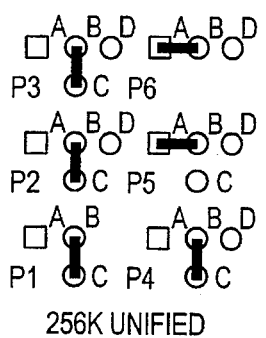
Figure 6:
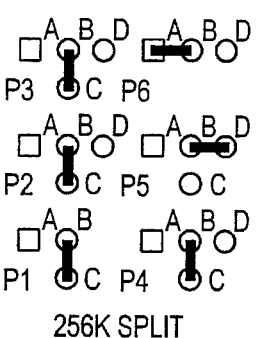
Figure 6:
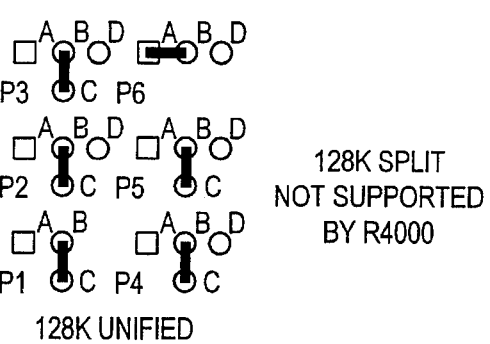
Figure 6:
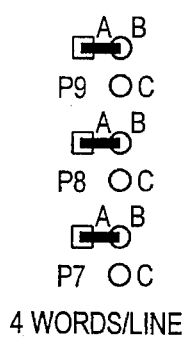
Figure 6:
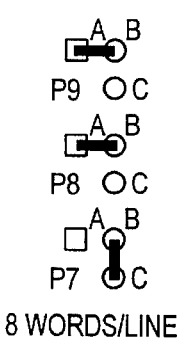
Figure 6:
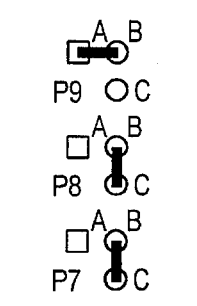
Figure 6:
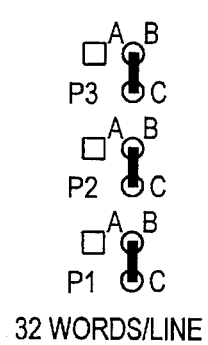

The maximum cache size of the present embodiment is 4 megabytes, divided into 256K words addressable by the address bits SCAddr[0:17]. To configure a secondary cache of a smaller cache size, one or more address bits within address bits SCAddr[12:17] are substituted by signals of known logic states. In this embodiment, such substituted bits are coupled to ground voltage using one or more jumpers of jumpers 301 of FIG. 3. The structure corresponding to jumpers 301 is shown in FIG. 5a, and the various configurations of jumpers 301 corresponding to various cache sizes are shown in FIG. 6. As shown in FIGS. 5a and 6, jumpers 301 comprise six jumpers P1–P6. Jumper P1 has three terminals a–c, for selecting at terminal b between two input signals. Each of jumpers P2–P5 has four terminals a–d which can be selectively shorted to provide at terminal b one of three input signals. P6 has three terminals a, b and d which can be selectively shorted to provide at terminal b one of two input signals.

For each address bit in address bits SCAddr[12:17] substituted by the ground voltage, the locations in the memory portion 305 addressable by address bits SCAddr[0:17] are reduced by a factor of two. Thus, substituting zero to five address bits of SCAddr[12:17] by ground voltage, flexible cache module 200 of FIG. 2 can be configured as a 4 Megabyte, 2 Megabyte, 1 Megabyte, 512K, 256K or 128K secondary cache. For example, if flexible cache module 200 is to be configured as a 2 Megabyte unified or split cache, a jumper connection is made at jumper P1 between terminals b and c to ground the output signal at the b terminal jumper P1. At the same time, the remaining bits of address bits SCAddr[12:16] are transmitted by connecting in each of jumpers P2–P6 the a and b terminals. Alternatively, to achieve a 256K unified or split cache, the b terminals of jumpers P1–P4 are grounded.

Further, in this embodiment, if a split cache is implemented, the address bit SCAddr[17] by convention indicates whether instruction or data is accessed. Thus, other than the 4 Megabyte split cache, the present embodiment implements a split cache by substituting address bit SCAddr[17] for one of the active address bits SCAddr[12:16]. An active address bit is an address bit which is not substituted by the ground voltage to configure the cache size of the secondary cache. For example, in this embodiment, to implement a 2 megabyte split cache, the b and d terminals of jumper P2 are shorted, so that the address bit SCAddr[17] is transmitted as the output signal at the b terminal of jumper P2.

The line size of flexible cache module 200 is set by jumpers 304. FIG. 5b shows the structure of jumpers 304. The various line size settings of jumpers 304 are shown in FIG. 6. In FIG. 5b, jumpers 304 is shown to comprise jumpers P7–P9. Jumpers P7–P9 each receive one of address bits SCAddr[0:2] (buffered or unbuffered as described above in FIG. 3) and provide as output signals one of address bits TA[0:2], which are used to address memory portion 306. Each jumper comprises terminals a, b and c, to transmit as the output signal of each jumper either the input signal (i.e. one of address bits SCAddr[0:2]), or ground voltage.

In this embodiment, flexible cache modules 200 can be configured as a cache memory having a 4-word, 8-word, 16-word or 32-word line size. Since, for a given cache size, the number of tags required to implement a 4-word line size is twice that required to implement an 8-word line size, four times that required to implement a 16-word line size and eight times that required to implement a 32-word line size, each doubling of the line size reduces the number of tags required by a factor of two. In other words, the number of address bits necessary to specify a location in the tag portion of flexible cache module 200 decreases by one for each doubling of line size. Thus, in the present embodiment, ground voltage is substituted for an address bit of the tag portion of the cache memory for each doubling of line size. For example, as shown in FIG. 5b, to implement an 8-word line size, the address bit TA[0] is grounded by connecting terminals b and c of jumper P7. The output signals of jumpers P8 and P9 (i.e. TA[1:2]) are respectively coupled to address bits SCAddr[1] and SCAddr[2], by connecting in each of jumpers P8 and P9 the terminals a and b.

Another embodiment provides a maximum of one megabyte of cache memory. In this second embodiment, rather than 256K×4 SRAMs, 64K×4 SRAMs are used. Otherwise the second embodiment is substantially similar to the first embodiment described above.

Although the present invention is described using as examples the specific embodiments in the above detailed description, the detailed description is not intended to be limiting of the present invention. Many variations and modifications within the scope of the present invention are possible. The present invention is defined by the following claims.

We claim:

1. A method for configuring a variable sized cache memory, said cache memory having a data portion and a tag portion, each of said portions having a plurality of locations, addressed by a plurality of address lines, comprising the steps of:

receiving into said cache memory a first set of address signals on a first group of said plurality of address lines, said first set of address signals specifying a cache memory location in said data portion of said cache memory;

receiving a second set of address signals on a second group of said plurality of address lines, said second set address signals specifying a cache memory location in said tag portion of said cache memory;

limiting the total number of addressable cache memory locations by setting a first number of address signals in said first set of address signals each to a predetermined logic value to limit said first set of address signals to specify a predetermined number of cache memory locations in said data portion of said cache memory;

selecting a line size for said cache memory by setting a second number of address signals in said second set of address signals each to a predetermined logic value to limit said second set of address signals to specify a predetermined number of cache memory locations in said tag portion of said cache memory; and substituting one of said first set of address signals with a designated signal of said plurality of address lines to logically divide said cache memory into an instruction cache memory and a data cache memory, said designated signal indicating whether an instruction or a datum is accessed.

2. A structure for configuring a variable sized cache memory addressed by a plurality of address lines, comprising:

a data portion of said cache memory, said data portion of said cache memory including a plurality of cache memory locations, said data portion of said cache memory receiving a first set of address signals on a first group of address lines coupled to said plurality of address lines, said first set of address signals specifying a cache memory location in said data portion of said cache memory;

a tag portion of said cache memory, said tag portion of said cache memory including a plurality of cache memory locations, said tag portion of said cache memory receiving a second set of address signals on a second group of address lines coupled to said plurality of address lines, said second set of address signals specifying a cache memory location in said tag portion of said cache memory;

means for limiting the total number of addressable cache memory locations by setting a first number of address signals in said first set of address signals each to a predetermined logic value to limit said first set of address signals to specify a predetermined number of memory locations in said data portion of said cache memory;

means for selecting a line size for said cache memory, said means for selecting a line size setting a second number of address signals in said second set of address signals each to predetermined logic value to limit said second set of address signals to specify a predetermined number of memory locations in said tag portion of said cache memory; and substituting one of said first set of address signals with a designated signal of said plurality of address lines to logically divide said cache memory into an instruction cache memory and a data cache memory, said designated signal indicating whether an instruction or a datum is accessed.

* * * * *